United States Patent
Glotzbach et al.

(10) Patent No.: US 10,055,821 B2
(45) Date of Patent: Aug. 21, 2018

(54) DEVICE FOR AND METHOD OF ENHANCING QUALITY OF AN IMAGE

(71) Applicants: John W. Glotzbach, Allen, TX (US); Ibrahim E. Pekkucuksen, Plano, TX (US); Hamid Rahim Sheikh, Allen, TX (US)

(72) Inventors: John W. Glotzbach, Allen, TX (US); Ibrahim E. Pekkucuksen, Plano, TX (US); Hamid Rahim Sheikh, Allen, TX (US)

(*) Notice: Subject to any disclaimer, the term of this patent is extended or adjusted under 35 U.S.C. 154(b) by 0 days.

(21) Appl. No.: 15/011,527

(22) Filed: Jan. 30, 2016

(65) Prior Publication Data

US 2017/0221186 A1    Aug. 3, 2017

(51) Int. Cl.
*G06T 5/00* (2006.01)
*G06T 7/20* (2017.01)

(52) U.S. Cl.
CPC .......... *G06T 5/003* (2013.01); *G06T 7/20* (2013.01); *G06T 2207/20201* (2013.01); *G06T 2207/30201* (2013.01)

(58) Field of Classification Search
CPC .. G06K 9/00228–9/00261; G06T 2207/30201; G06T 5/002; G06T 5/003; G06T 7/20; G06T 2207/20201
See application file for complete search history.

(56) References Cited

U.S. PATENT DOCUMENTS

| | | | |
|---|---|---|---|
| 7,769,231 B2 | 8/2010 | Hong et al. | |
| 7,813,003 B2 | 10/2010 | Lin | |
| 8,264,490 B2 | 9/2012 | Debevic et al. | |
| 8,406,482 B1 | 3/2013 | Chien et al. | |
| 8,582,834 B2 | 11/2013 | Tong et al. | |
| 8,648,959 B2 | 2/2014 | Cocoran et al. | |
| 8,675,960 B2 | 3/2014 | Bhatt et al. | |
| 8,797,448 B2 | 8/2014 | Cocoran et al. | |
| 8,824,747 B2 | 9/2014 | Free et al. | |
| 8,824,808 B2 | 9/2014 | Brandt et al. | |
| 8,929,652 B2 | 1/2015 | Moon et al. | |
| 9,113,143 B2 | 8/2015 | Urech et al. | |
| 2008/0175509 A1* | 7/2008 | Wheeler | G06K 9/00281 382/260 |
| 2009/0263013 A1 | 10/2009 | Xiong et al. | |
| 2012/0120304 A1 | 5/2012 | Corcoran et al. | |
| 2013/0169834 A1 | 7/2013 | Cheng et al. | |
| 2013/0266181 A1 | 10/2013 | Brewer et al. | |
| 2015/0207986 A1* | 7/2015 | Kimura | G06K 9/00369 348/364 |
| 2015/0235087 A1* | 8/2015 | Bigioi | G06K 9/00624 382/103 |
| 2015/0262341 A1* | 9/2015 | Nash | H04N 5/23229 348/208.6 |
| 2016/0086316 A1* | 3/2016 | Lee | G06T 5/002 382/167 |

FOREIGN PATENT DOCUMENTS

WO    WO 2011155902    12/2011

* cited by examiner

*Primary Examiner* — Brian Werner (57) ABSTRACT

A method to enhance quality of an image is described. The method comprises receiving the image; identifying a region of the image having skin; performing motion analysis in the region of the image having skin; and if motion is detected, then controlling blending in the region of the image having skin to avoid blurring of texture in the skin.

20 Claims, 7 Drawing Sheets

DEVICE FOR AND METHOD OF ENHANCING QUALITY OF AN IMAGE

FIELD OF THE INVENTION

An embodiment of the present invention relates generally to integrated circuit devices, and in particular, to a circuit for and a method of enhancing quality of an image.

BACKGROUND OF THE INVENTION

Digital image processing has become very commonly used and important in many fields. Digital image processing acquires an image from a sensor and transforms the image to viewable content. However, digital images can be subject to various aberrations, and must be processed to reduce or eliminate the aberrations. The resulting processed image should have high quality, avoiding artifacts such as noise and blur as much as possible. Conventional image processing techniques to enhance the quality of a captured image combines multiple frames. That is, more than one frame may be used to remove artifacts, which may be commonly observed during a zoom operation, for example.

One particularly common application for digital imaging is with consumer devices having cameras, such as digital cameras, wireless telephones including smartphones, tablet computers, or other computers having cameras. Many users of consumer devices such as smart phones and tablets have a specific interest in photographs of the human face. The human face is a very common subject in photographs, and it is therefore very important to recreate the face without introducing aberrations. Recreating images of the human face without aberrations can also be very significant in the area of digital surveillance, such as in commercial or residential security systems.

Accordingly, devices and methods that enhance quality of an image, and more particularly provide improved images without aberrations commonly found in digital images, are beneficial.

SUMMARY OF THE INVENTION

A method to enhance quality of an image is described. The method comprises receiving the image; identifying a region of the image having skin; performing motion analysis in the region of the image having skin; and if motion is detected, then controlling blending in the region of the image having skin to avoid blurring of texture of the skin.

Another method to enhance quality of an image comprises receiving the image, wherein the pixel for the image is in a first format; identifying a region of the image having skin; converting pixel data in the region of the image having skin from the first format to a second format; comparing the pixel data in the second format to a plurality of skin tone definitions in the second format; selecting a skin tone definition of the plurality of skin tone definitions; and converting the pixel data in the region of the image having skin from the second format back to the first format.

A further method to enhance quality of an image comprises receiving the image; identifying a region of the image associated with an object in the image; applying first image processing for the object in the image; applying second image processing on the remaining portions of the image after applying specific processing for the object in the image.

A device for enhancing quality of an image is also described. The device comprises a processor circuit configured to receive pixel data for a frame associated with the image, wherein the pixel data is in a first format; identify a region of the image having skin; convert pixel data in the region of the image having skin from the first format to a second format; compare the pixel data in the second format to a plurality of skin tone definitions in the second format; select a skin tone definition of the plurality of skin tone definitions; and convert the pixel data in the region of the image having skin from the second format back to the first format.

A computer-readable storage medium having data stored therein representing software executable by a computer for enhancing quality of an image is also disclosed. The computer-readable storage medium comprises instructions for receiving pixel data for a frame associated with the image, wherein the pixel data is in a first format; instructions for identifying a region of the image having skin; instructions for converting pixel data in the region of the image having skin from the first format to the second format; instructions for comparing the pixel data in the second format to a plurality of skin tone definitions in the second format; instructions for selecting a skin tone definition of the plurality of skin tone definitions; and instructions for converting the pixel data in the region of the image having skin from the second format back to the first format.

Other features will be recognized from consideration of the Detailed Description and the Claims, which follow.

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The various devices and methods set forth below apply specific processing to avoid artifacts and to enhance the quality of face subjects in captured photographs. Using knowledge of a face as the subject in a scene, analysis is performed to record the skin color and identify all regions where specific processing should be applied. In these regions having skin color, parameters of existing noise filters and edge enhancement operation are controlled to minimize artifacts. For example, edge enhancement is reduced to avoid enhancing artifacts from noise within a face region. Further by using a table having multiple skin tone selections, more specific skin tone definitions can be used, which avoids processing in non-face regions. Specific processing may also be applied to avoid and remove artifacts in a captured image during the multi-frame capture use case. Local motion analysis can also be performed between frames in the face region. If local motion is detected, then the blending parameters are controlled to avoid blurring across the face. A custom noise filter may be applied only in face regions to remove high amplitude noise that, if not controlled, may lead to artifacts.

Figure 1:
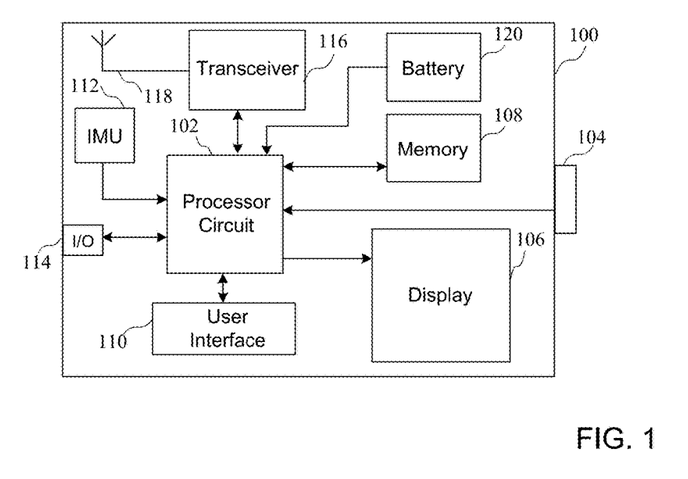
FIG. 1 is a block diagram of a device for enhancing the image quality of an image.

Turning first to FIG. 1, a block diagram of a device for enhancing the image quality of an image is shown. In particular, a device 100 comprises a processor circuit 102 coupled to an image sensor 104. The device 100 could be any type of device, or a component such as an integrated circuit of a device or system, adapted to capture a digital image. The image sensor 104 could be a digital camera, or any portion of a digital camera, such as a lens or other image sensing element. The processor circuit could be coupled to a display 106 for displaying a captured image, and more particularly, displaying a digital image having enhanced image quality. As will be described in more detail below in reference to FIG. 2, the processor circuit, alone or in combination with other elements, can generate a digital image having enhanced image quality.

The processor circuit 102 may also be coupled to a memory 108 that enables storing information related to various frames of an image, or resulting digital images having enhanced image quality. The memory 108 could be implemented as a part of the processor circuit 102, or could be implemented in addition to any cache memory of the processor, as is well known. A user interface 110, which may be separate from the display, or also may be a part of, or responsive to, the display, is also shown. The processor circuit 102 may also be coupled to other elements that receive inputs or enable the capturing of a digital image. For example, an inertial measurement unit (IMU) 112 can provide various information related to the motion or orientation of the device 100. The processor circuit 102 may also receive input by way of an input/output (I/O) port 114 or a transceiver 116 coupled to an antenna 118. A battery 120 may be implemented to provide power to the processor and other elements of the device 100.

In digital photography, preserving the human face and reconstructing the human face without artifacts is very important to the consumer's perception of image quality. That is, aberrations in skin in an image, such as a face for example, can significantly degrade a perception of image quality. Typical distortions of the human face include blurring due to motion, residual noise artifacts, and the oversharpening of these noise artifacts. The devices and methods set forth below enable reducing or eliminating the distortions that may show up in the face, and therefore provide enhanced image quality.

The devices and methods acquire images from a camera system along with results of face detection, and control noise filtering and edge enhancement parameters that would be applied in regions that are detected as skin tone. Multiple dictionary definitions of skin tones are also provided to cover a variety of possible skin tones that could be present in an image. By selecting a skin tone definition from the dictionary, the noise filter parameters can be better controlled to avoid over-processing in non-face regions. In many scenes, non-face regions are easily confused with skin tone if only color is used as a discriminator. Analyzing color of the region detected as a face region enables selecting one of the dictionary entries defining skin for a particular scene, and therefore prevents the incorrect processing of areas of the image that do not have skin.

Motion analysis to avoid face blur allows multiple frames to blend and preserve detail in the face, even when there are slight motions, which are difficult to detect. That is, a motion blur reduction method enables avoiding introducing motion blur when combining frames if the face has slight motion. A specific noise filter also runs only on face regions and removes high amplitude spike noise, which is a type of noise that is usually not removed by typical noise filters running elsewhere in the image processing process. By removing this high amplitude spike noise in the face region, the remaining noise looks more natural and is less susceptible to sharpening artifacts. Applying specific noise filters only in regions identified as skin such as a face region allows more robust processing to remove more artifacts and provide a higher quality image.

Figure 2:
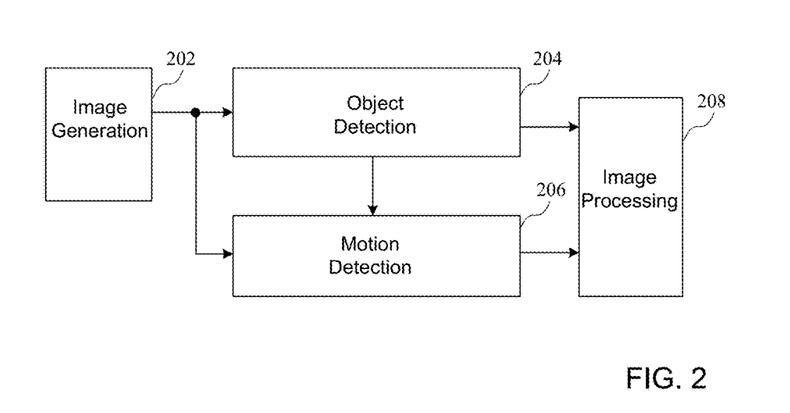
FIG. 2 is a block diagram showing processing blocks implemented in the device of FIG. 1 for enhancing the image quality of an image.

As shown in FIG. 2, a block diagram of processing blocks implemented in the device of FIG. 1 for enhancing the image quality of an image is shown. The processing blocks of the processing arrangement of FIG. 2 may be implemented in one or more elements of FIG. 1, such as the processor circuit 102, the image sensor 104, and the memory 108 for example. An image generation block 202, which may receive pixel data from an image sensor 104 for example, enables generating an array of pixels, where each pixel has data associated with one or more colors, such as red, green and blue for example, or other combinations of 3 colors (cyan, magenta, and yellow) or 4 colors (red, blue, green and yellow) as are well known. An object detection block 204 and a motion detection block 206 provide additional information related to the image that enables enhancing the quality of the image. For example, object detection block 204 enables detecting an object, such as a portion of skin or a face in an image, while motion detection enables detecting local motion associated with the object, as will be described in more detail below. An image processing block 208 can then enhance the quality of the image to eliminate aberrations, as will also be described in more detail below. While specific reference is made to frames of an image captured by an image sensor and stored as images having enhanced quality, it should be understood that the various methods set forth below could be used to improve the image quality of digital images, including multi-frame images, which are already captured and stored.

Figure 3:
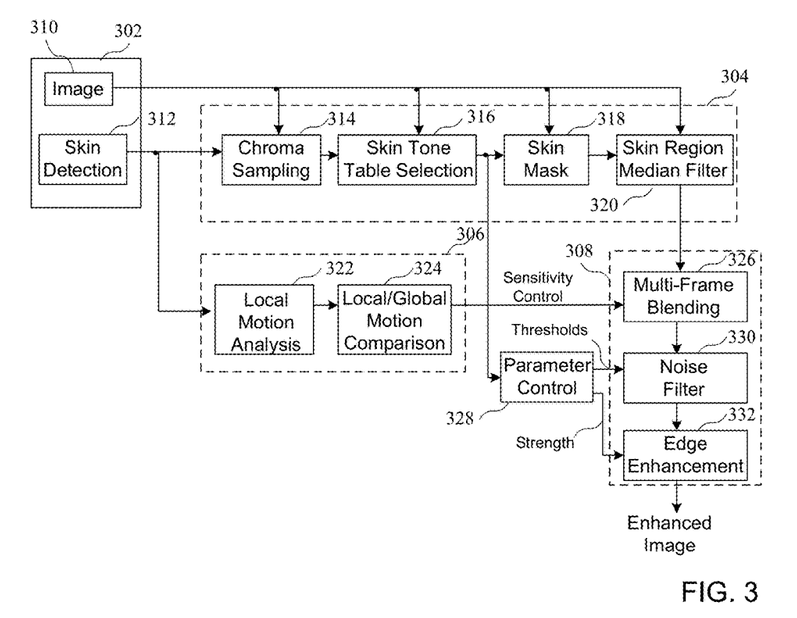
FIG. 3 is another block diagram showing processing blocks implemented in the device of FIG. 1 for enhancing the image quality of an image.

The circuit of FIG. 2, and more particularly the specific processing blocks of FIG. 3, enable multi-frame image processing that is more robust than existing devices and methods. Typical distortions of the human face include blurring due to motion, residual noise artifacts, and the over-sharpening of these noise artifacts. By removing this noise in areas having skin, such as the face region, the remaining noise looks more natural and is less susceptible to sharpening artifacts. A motion blur reduction method avoids introducing motion blur when combining frames if the face has slight motion. Further, motion analysis used to avoid face blur allows multiple frames to be blended and preserve detail in the face, even when there are slight motions, which are difficult to detect.

Turning now to FIG. 3, another block diagram of processing blocks implemented in the device of FIG. 1 for enhancing the image quality of an image, such as an image captured by a digital camera, is shown. The various processing blocks of FIG. 3 could be implemented in the device of FIG. 1, such as in the processor of FIG. 1 for example. An image detection block 302 is coupled to provide frames associated with an image as well as other data associated with the frames to a skin detection block 304 and motion detection block 306. Information associated with the skin detection and motion detection is provided to an image processing block 308 to generate an enhanced image based upon a captured image.

Figure 4:
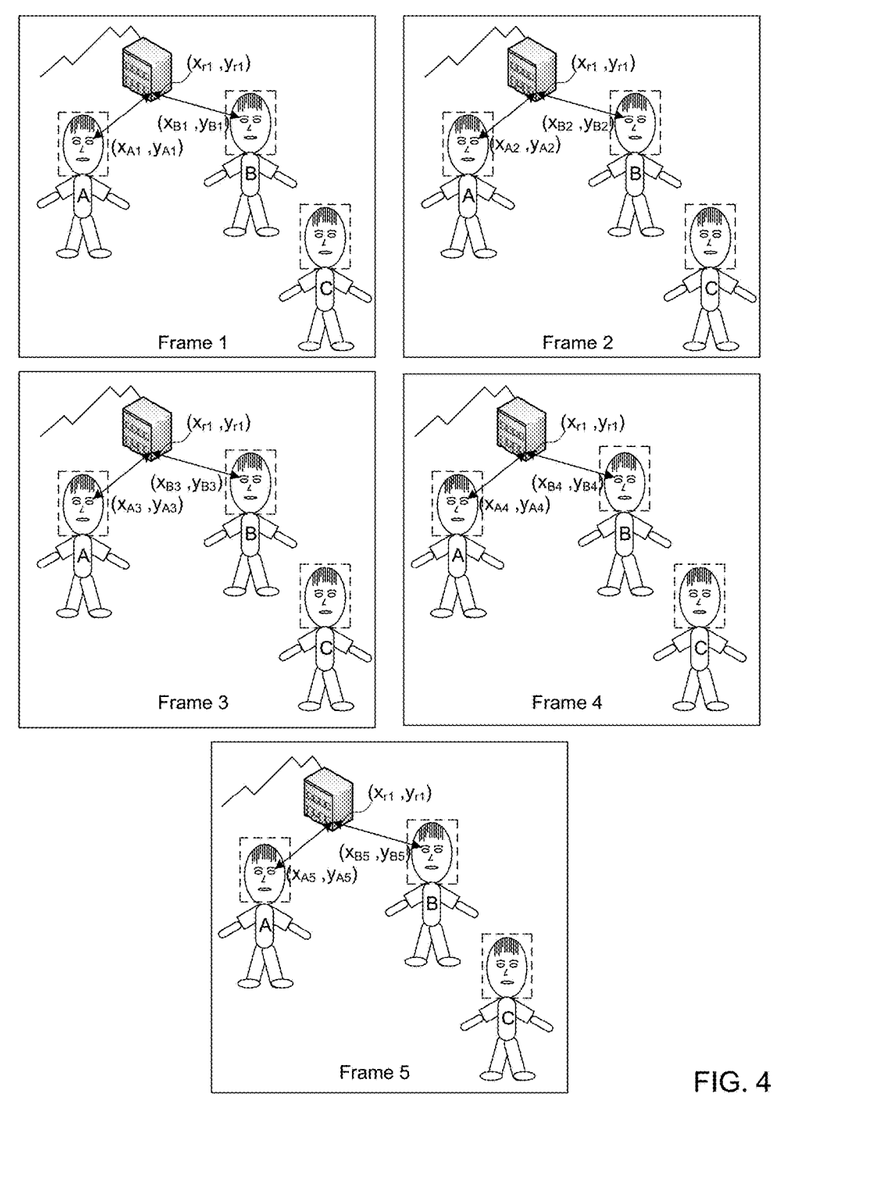
FIG. 4 is a series of frames associated with an image and shows feature points and distances that enable detecting motion of an area of the image having skin.

The image detection block 302 comprises an image generation block 310 that generates frames of images that are provided to the skin detection block 304 and a skin detection block 312. Each frame associated with an image may comprise pixel data associated with a plurality of pixels of a frame, where each pixel may include color information associated the pixel. As will be described in more detail below, the pixel data may be stored in a first format, such as an RGB format, and converted to a second format, such as a format having hue, for easier processing, and more particularly easier tone detection. The skin detection block 312 identifies one or more areas of an image associated with skin that are provided to various processing blocks of the skin detection block 304 and the local motion block 306. Image frames may be provided with rectangles representing the locations of detected faces in the image, as shown in FIG. 4. That is, it should be noted that while reference is made to skin, the face is a region of skin that is often used for skin tone determination and specific processing associated with regions of skin. The color values inside these rectangular regions are sampled and combined to pick one of a plurality of entries from a dictionary of skin tone tables. More particularly, a plurality of frames of an image are provided to each of a chroma sampling block 314, a skin tone table selection block 316, a skin mask block 318 and a skin region median filter 320 of the skin detector block 304. Each processing block of the skin detection block 304 uses information from another processing block and the image itself to generate information.

The chroma sampling block 314 identifies the chrominance values (e.g. Cb and Cr) values associated with the pixels for each frame of an image, and provides the chrominance values to a skin tone table selection block 316. Using coordinates associated with region of skin provided by the skin detection block 312, Cb and Cr values are sampled from all detected skin (e.g. face) regions. According to one implementation, these values are converted to hue values in the hue, saturation and value (HSV) color space. Skin tone dictionary definitions are defined, each with a different hue center covering a specific skin tone. The Euclidian distance between each sampled face pixel and these dictionary definition centers are calculated and sorted. Finally, the dictionary definition with the minimum median distance is selected as the skin tone for a particular frame. Since the skin tones in these dictionary definitions are defined tighter than a single skin tone map, non-face regions are rejected more successfully. A skin mask is generated by the skin mask block 318, where the skin mask receives the image and identifies the areas of the image having color that matches the selected skin tone definition. The skin region median filter 320 also receives the skin mask to perform specific filtering operations on the portions of the image having skin. An implementation of the skin region median filter 320 is shown and described in more detail in reference to FIG. 5.

Portions of the image associated with skin are provided to the motion detection block 306 having a local motion analysis block 322 and a local/global motion comparison block 324. The face location data is also used to direct a motion analysis in these regions to determine if there is likelihood of blurring. If the local motion analysis in the skin region is not in agreement with the global motion analysis that is performed in the multi-frame capture system, then the image processing forces the blending to be more sensitive to error during blending, which has the effect of suppressing blending even for slight motions. This prevents blurring in skin regions caused by blending frames where the skin has slight motion, which is not easily detectable.

An output of the local/global motion comparison block 324 comprising a sensitivity control signal is provided to a multi-frame blending block 326 that enables or prevents blending of pixels of the skin regions depending upon a level of local motion that is detected in the skin regions. In a multi-frame capture system, the camera uses more than one image frame to improve the image quality of the final resulting image. A registration system is used in a multi-frame capture system to align all frames to a reference frame. Once aligned, the frames are blended using a motion-sensitive process to avoid introducing ghost artifacts in areas containing motion. Blending works by comparing the current frame that is to be blended with the reference frame and averaging the two frames together when the difference between the frames is small. However, only the reference frame is used when the difference between the frames is large. In image sequences having a human face, slight motions in the face region do not generate enough error to ultimately suppress the blending. Therefore, while blending may be suppressed when local motion in the face is detected, blending of pixels in areas of the face may be performed if the local motion is determined to be small enough.

The human face has multiple features where motion can be detected, such as the eyes, nose, mouth, and hair, for example. Between these high-level features, the face only has more subtle features such as skin texture. If the face is moving during the image capture, these subtle features end up blurring together. That is, the skin texture is removed and an unnatural image is created. While the high level features such as the nose, eyes and mouth remain sharp when there is motion, the areas between these features may be blurred, including within the hair region. The small differences in these low-contrast areas do not generate enough error to suppress blending of these frames. As will be described in more detail below, local motion can be detected based upon analysis of the movement of the skin region. Motion analysis to avoid face blur allows, using the multi-frame blending block 326, multiple frames to be blended preserve detail in the face, even when there are slight motions that are difficult to detect.

In order to suppress blending in the face regions, the motion detection block detects motion in the face region that is different from global motion. The first step is to detect feature points ($x_r$, $y_r$) within the face region of a key reference frame, as shown in FIG. 4 where a reference point is an eye designated ($x_{A1}$, $y_{A1}$) for person A. Using one additional frame of a capture set having the plurality of frames, these feature points are tracked to capture the local motion within the face region using points ($x_i$, $y_i$) of a frame other than the reference frame. The global motion of these two frames is described by an affine matrix, M, and is used to compute the location in an input frame to find each output pixel. That is, the affine matrix M represents an estimate of the global motion between frames. Global motion is used to align the frames. In order to merge several frames as a part of a blending process, but still preserve the sharpness, it is necessary to first align the frames. When evaluating the frames for local motion, the affine matrix M is used to compensate for global motion by transforming the frame using the affine matrix M.

Each feature point ($x_r$, $y_r$) in the reference frame is mapped to a point in the non-reference frame, ($x_i'$, $y_i'$), as shown in the following equation 1:

$$\begin{bmatrix} x_i' \\ y_i' \end{bmatrix} = M \begin{bmatrix} x_r \\ y_r \end{bmatrix} \qquad \text{Equation 1}$$

The error for each point ($x_i'$, $y_i'$) is computed by comparing the mapped point (i.e. an expected location ($x_i$, $y_i$) of the feature point) to the actual feature point location, ($x_i'$, $y_i'$), as shown in the following equation 2:

$$\varepsilon^2 = (xi - xi')^2 + (yi - yi')^2 \qquad \text{Equation 2}$$

The average error for all feature points in the face region is associated with local motion, and is used to determine a suppression weight, which is a value between 0 and 1 as shown in the following equation 3:

$$w = \text{MIN}(\text{MAX})((\varepsilon^2 - T)m, 0), 1) \qquad \text{Equation 3}$$

Lower values make the blending more sensitive to small errors and values close to 1 maintain the default sensitivity of the blending. The weight, w, is passed as a parameter to the multi-frame blending block 326 to control the sensitivity of the blending. T and m in the above equations are tunable parameters to control the sensitivity of the algorithm to the amount of face motion. By way of example, T could be equal to 2.5 and m could be equal to 1.4.

As shown in FIG. 4, a series of frames is associated with an image and shows feature points and distances that enable detecting motion of an area of the image having skin. Local motion associated with skin, such as a portion of a face, can be determined based upon the movement of a feature point of the face. That is, the motion of an easily identifiable portion representing a feature point of a face, such as the eyes or nose, can be tracked to determine whether the face is moving by tracking the movement of the feature point with respect to a fixed point, designated in each of the frames as $X_{r1}$, $Y_{r1}$ as described above. Feature points associated with faces (identified by the dashed boxes) can be tracked between frames to determine whether the movement of a face is based upon local motion or global motion. Global motion could be determined based upon movement of the camera for example, where all of the objects of the image are moving based upon the movement of the camera. That is, global motion can be determined by the movement of multiple objects in the image with respect to an object, such as a corner of a building, designated as ($X_{r1}$, $Y_{r1}$) in FIG. 4. In contrast, local motion is determined based upon whether the face of a single person is moving independent of global motion. For example, the movement of a feature point of the eye of person A, designated by feature point ($X_{A1}$, $Y_{A1}$), can be tracked to determine local motion. A reference frame, such as Frame 3, can be compared with one or more of the other frames to determine both global motion and local motion, as described above.

Referring again to FIG. 3, filtering is also performed based upon a selected skin tone definition. A parameter control block 328 also controls the operation of a noise filter block 330 and an edge enhancement block 332. Noise filter and edge enhancement parameters optimized for face reconstruction can be applied in regions that are detected as skin tone. For example, the parameter control block 328 can provide threshold values to the noise filter 330 and strength values to the edge enhancement block 332. It should be noted that skin tone tends to change from frame to frame depending on scene and camera capture parameters. If a skin tone definition is kept broad to cover all possible face regions as is done in conventional devices, non-face regions can also become included and processed with face optimized parameters. To avoid including unintended regions as skin regions, a dictionary based face region selection is implemented, and parameters that control the noise filter block 330 and the edge enhancement block 332 can be selected based upon the selected skin tone definition.

More particularly, high quality face reconstruction in an image requires good control over the type of noise that is rendered, as controlled by the noise filters. While this is true for all parts of an image, consumers desire to have a clean result in the face region. In the face region, various aspects of the image quality can be controlled as a tradeoff. For example, high resolution features are less important, though preserving skin texture is important. With these goals, a median noise filter 320 with a threshold value is used to remove high amplitude spike noise in the face region. High amplitude spike noise is problematic because it is not handled well by typical noise filters, and is often passed through to the noise filter output image. In order to remove the noise in the face using the noise filter, thresholds would have to be set very strong, which would remove too much detail in all other parts of the image. If the spike noise is preserved by the noise in the face filter, edge enhancement in the system then adds additional enhancement to the spike noise. It would therefore be better to remove this type of high amplitude noise in the critical face region prior to noise filtering and edge enhancement in other parts of the image.

Median filters may be used in the image processing system according to the implementation of FIG. 3 to remove high amplitude spike noise. However, median filter have the drawback of removing significant amounts of detail, including the desired skin texture in the face region. Therefore, a threshold is introduced as a tunable parameter of a median filter according to the implementation of FIG. 3 to avoid removing skin texture details in the face region. After computing the median in a small neighborhood around a current pixel, the median is compared to the threshold. If the median is smaller than the threshold, then no change is made and the output pixel is set to the value of the input pixel. If the median is larger than the threshold, then the output pixel is set to the median value of the neighborhood. This use of a threshold for the median filter prevents the filter from removing the critical skin texture in the face region. A second control on the side effects of running the noise filter is to restrict the operation of the median filter to only run in the region determined to contain skin, such as a human face.

Figure 5:
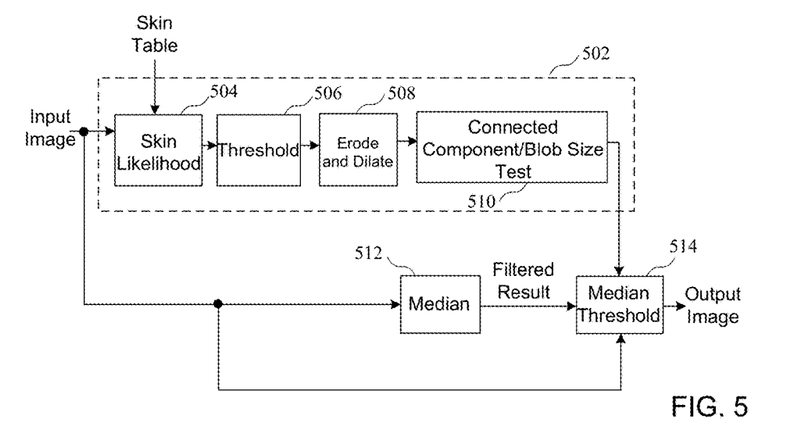
FIG. 5 is a block diagram showing the implementation of a face-localized median noise filter.

FIG. 5 shows an example of a face-localized median noise filter, and may be implemented in the skin region median filter 320, for example. The input image and a selected skin definition is provided to a skin detection portion 502 having a skin likelihood block 504, where a 3×3 block of pixels associated with an image may be analyzed. A decision of the skin likelihood block 504 is provided to a threshold block 506, which compares a skin likelihood value with a threshold to determine whether a pixel should be considered to be skin, and therefore to determine which pixels need to be replaced. A localization path of the skin likelihood block 504 computes the likelihood of each neighborhood to be skin or non-skin. After binary decisions associated with regions are made, these decisions may be filtered using morphological operators, including erosion followed by dilation. Erosion is an operation that erodes the boundaries of regions of foreground pixels, allowing the area of foreground pixels to be reduced in size, as is well known. Dilation is the operation of changing background pixels to the foreground, as is also well known. These filtering operations are followed by a connected component analysis to identify blobs of skin regions in a connected component/blob size test block 510. Only blobs of certain size are retained as part of the final face region mask. For example, portions of an image that may have a color that is close to the selected skin tone can be rejected based upon the size of shape of the portion on the image. That is, a portion of an image may be determined to be too small to be a face, or have a shape that would not likely be a face or enough of a portion of a face that special processing in the portion would be beneficial. The face-localized median noise filter comprises a median noise filter 512 configured to receive the input image and generate a filtered image. Selected portions of the filtered image, based upon the results of the skin detection portion 502, are compared to a median threshold in a median threshold block 514, which generates an output image. That is, the median threshold block 514 computes the median in a small neighborhood around a current pixel, the median is compared to the threshold. If the median is smaller than the threshold, then no change is made to the pixel in the input image and the output pixel is set to the value of the input pixel. If the median is larger than the threshold, then the output pixel is set to the median value of the neighborhood. Further, only those pixels in areas identified by skin detection portion 502 are analyzed by the median threshold block 514.

Figure 6:
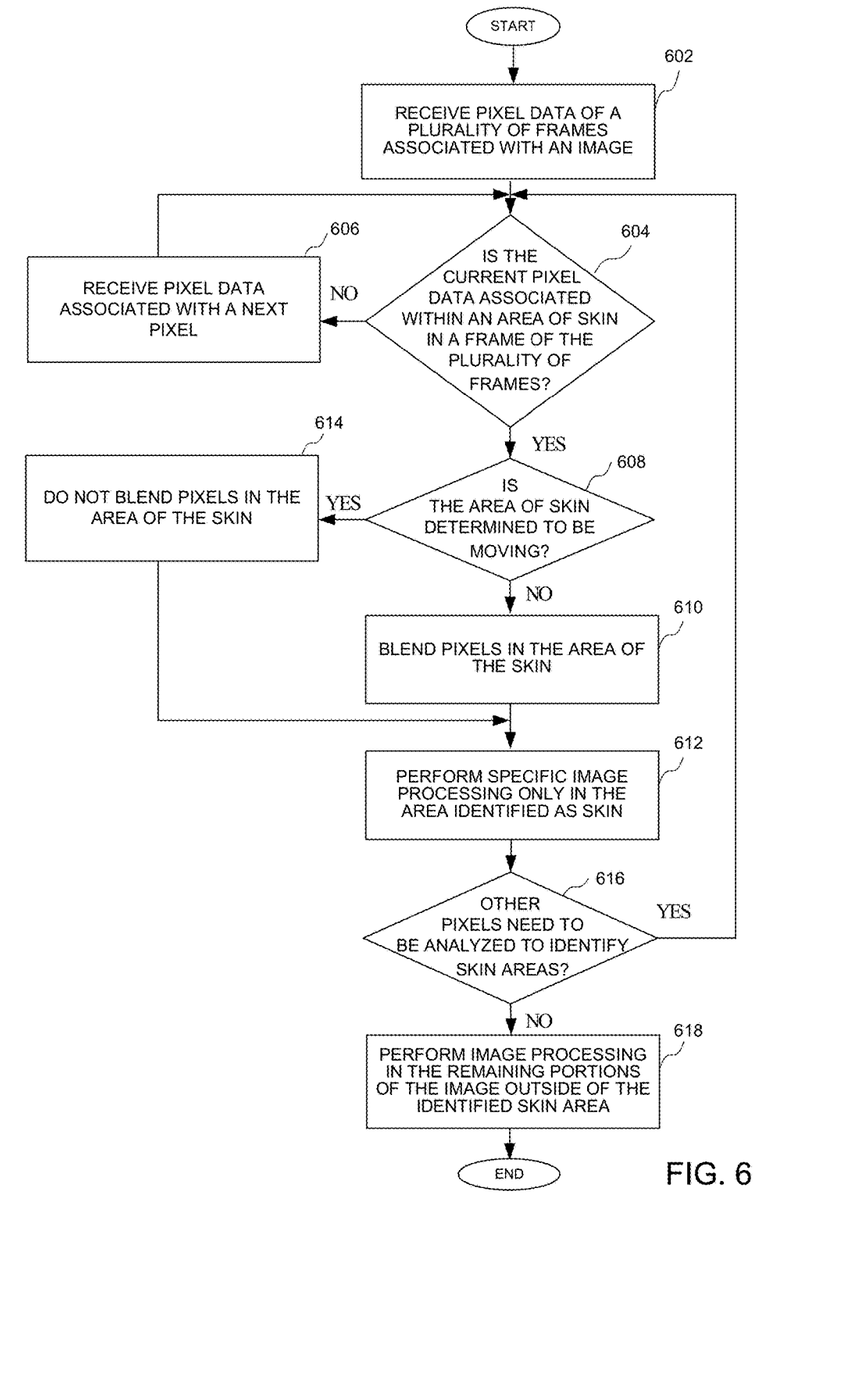
FIG. 6 is a flow chart showing a method of enhancing the quality of an image.

Turning now to FIG. 6, a flow chart shows a method of enhancing the quality of an image. The method of FIG. 6, as well as the methods of FIGS. 7-10 as set forth below, could be implemented in the device of FIG. 1, and particularly the processing blocks of FIG. 3, for example. In particular, pixels of a plurality of frames are processed to generate an image at a block 602. It is then determined whether a pixel is within an area of skin in a frame of the plurality of frames at a block 604. The determination could be made by the skin detection block 312, for example. If the pixel is not determined to be in an area of skin, pixel data associated with a next pixel is received at a block 606. If pixel data is determined to be associated with an area of skin, it is then determined if the area of skin is determined to be moving at a block 608. The determination could be made by the motion detection block 306, for example. If the area of skin is determined to be not moving, pixels in the area of the skin are blended at a block 610. Specific image processing can then be performed only in the area identified as skin at a block 612. Examples of specific processing is described in relation to the operation of the noise filtering block 330 and the edge enhancement block 332, for example. If an area of skin is determined to be moving at the block 608, pixels in the area of the skin are not blended at block 614, and the specific image processing is then performed only in the area identified as skin at the block 612. It is then determined whether other pixels need to be analyzed to identify skin areas at a block 616. If so, the next pixel is analyzed at the block 604. Otherwise, image processing is performed in the remaining portions of the image outside of the identified skin area.

Figure 7:
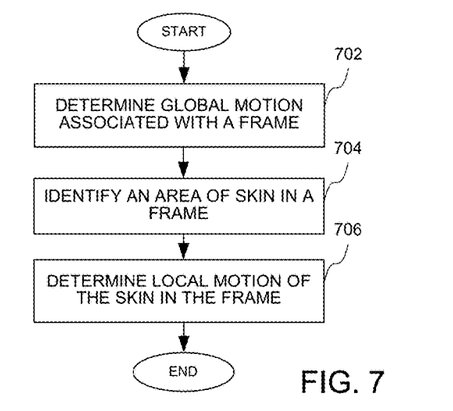
FIG. 7 is a flow chart showing a method of establishing a level of local motion to enable enhancing the quality of an image.

Turning now to FIG. 7, a flow chart shows a method of establishing a level of local motion to enable enhancing the quality of an image. The method of establishing a level of local motion could be implemented according to the motion detection block 306, as set forth above. An area of skin in a frame is identified at a block 704, and the local motion of the skin is compared to the global motion at a block 706. Local motion is used to implement processing features such as blending, as set forth above.

Figure 8:
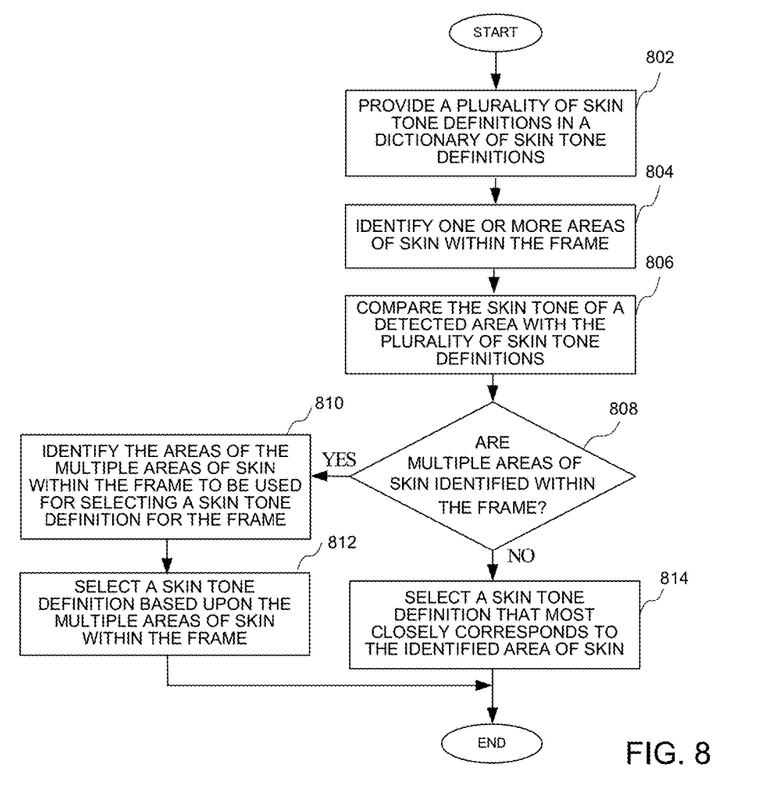
FIG. 8 is a flow chart showing a method of selecting a skin tone for a frame to enable enhancing the quality of an image.

Turning now to FIG. 8, a flow chart shows a method of selecting a skin tone for a frame to enable enhancing the quality of an image. In particular, a plurality of skin tone definitions in a dictionary of skin tone definitions are provided at a block 802. One or more areas of skin are identified within the frame at a block 804. The skin tone of a detected area is compared with the plurality of skin tone definitions at a block 806. It is then determined whether multiple area of skin are identified within the frame at a block 808. If so, multiple areas of skin to be used for selecting a skin tone definition for the frame are identified within the frame at a block 810, and a skin tone definition based upon the multiple areas of skin within the frame is selected at a block 812. Otherwise, a skin tone definition that most closely corresponds to the single identified area of skin is selected at a block 814.

Figure 9:
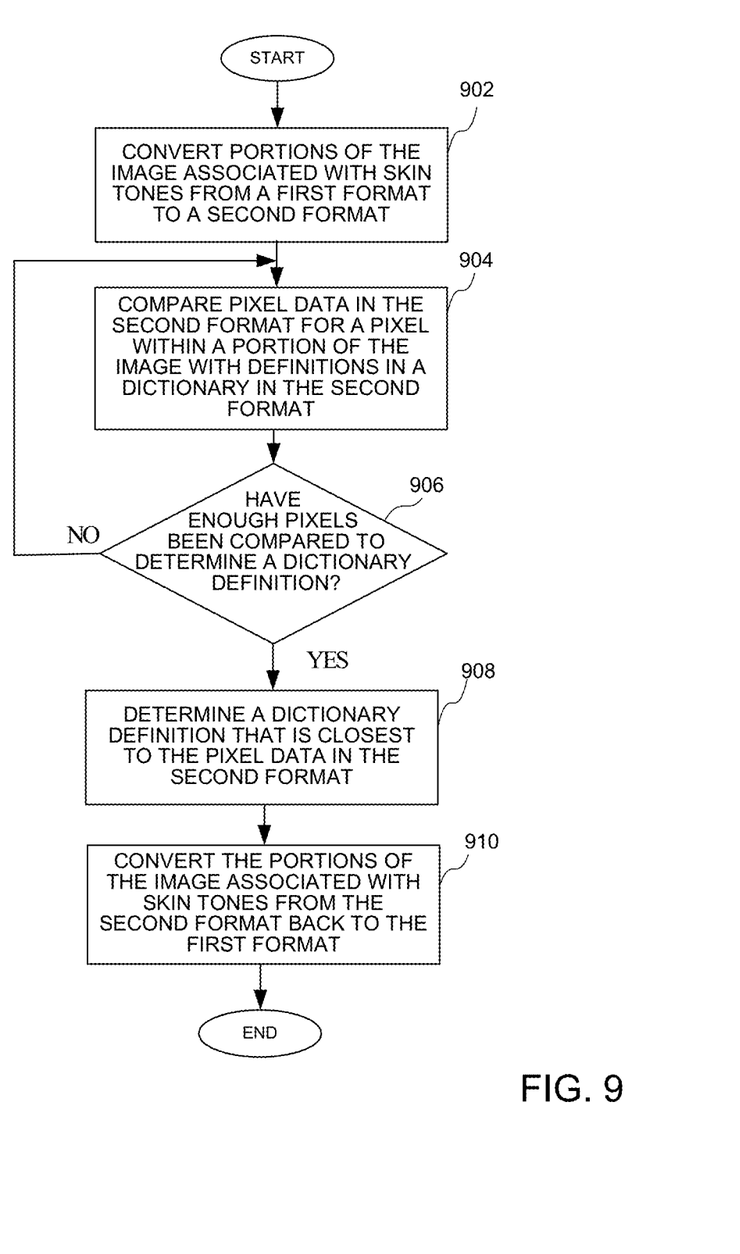
FIG. 9 is a flow chart showing a method of converting data associated with an image to enable selecting a skin tone for a frame associated with an image.

Turning now to FIG. 9, a flow chart shows a method of converting data associated with an image to enable selecting a skin tone for a frame. In particular, portions of the image associated with skin tones are converted from a first format to a second format at a block 902. Pixel data in the second format for a pixel within a portion of the image is compared with definitions in a dictionary in the second format at a block 904. It is then determined if enough pixels have been compared to determine a dictionary definition at a block 906. If so, a dictionary definition that is closest to the pixel data in the second format is determined at a block 908. The portions of the image associated with skin tones are converted from the second format back to the first format at a block 910. The selection of skin tone for a frame could be implemented according to the skin detection block 304.

Figure 10:
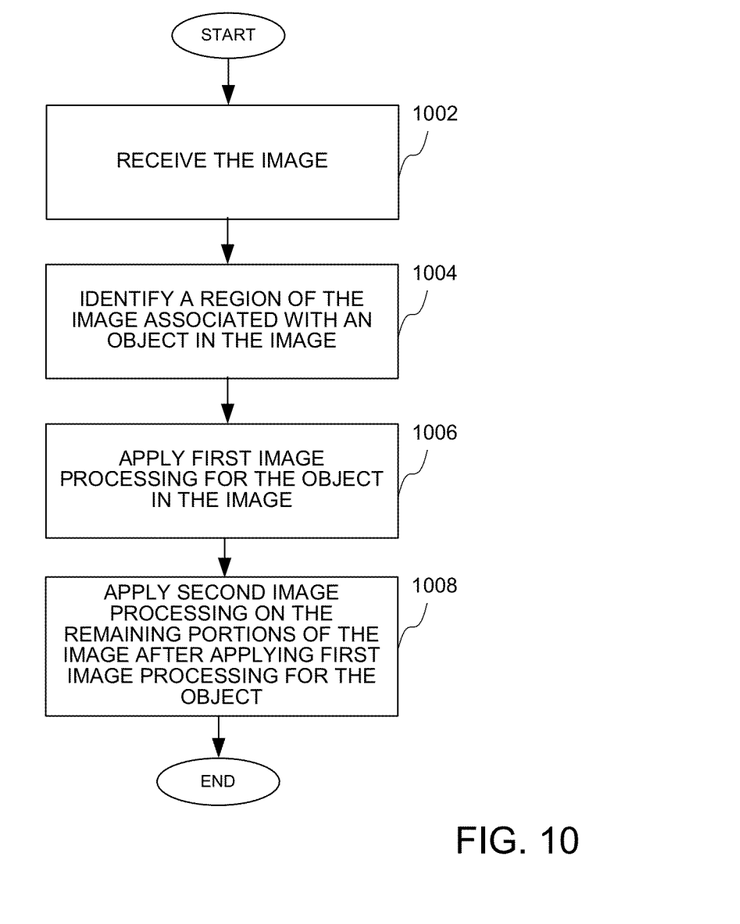
FIG. 10 is a flow chart showing a method of enhancing the quality of an image by applying specific image processing associated with an object in the image.

Turning now to FIG. 10, a flow chart shows a method of enhancing the quality of an image by applying specific image processing associated with an object in the image. In particular, the image is received at a block 1002. A region of the image associated with an object in the image is identified at a block 1004. First image processing is applied for the object in the image at a block 1006. Second image processing is applied on the remaining portions of the image after applying specific noise filters for the object at a block 1008. By way of example, one or more objects in the image could be people or animals, where the first image processing is performed on the people or animals to provide greater resolution to the people or animals. That is, the first image processing would provide sharper images for the people or animals, even if they are at a distance and generally smaller than other objects in the image, compared to other portions of the image.

It can therefore be appreciated that new to devices for and methods of enhancing quality of an image have been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A method to enhance quality of an image, comprising:
   receiving the image;
   identifying a region of the image having skin;
   performing, by a processor circuit, local and global motion analysis in the region of the image having skin; and
   if motion is detected, and based on results of local and global motion analysis, then controlling, by the processor circuit, blending in the region of the image having skin to avoid blurring of texture of the skin.

2. The method of claim 1 further comprising establishing a feature point associated with the region of the image having skin in a reference frame, wherein the motion is detected based upon a location of the feature point in a second frame compared to a location of the feature point in the reference frame.

3. The method of claim 2 further comprising establishing a local motion threshold, wherein a local motion is detected if the motion exceeds the local motion threshold.

4. The method of claim 3 further comprising determining a global motion associated with frames of the plurality of frames.

5. The method of claim 4 wherein performing motion analysis in the region of the image having skin comprises mapping the feature point on the reference frame to the feature point on the second frame based upon a matrix associated with the global motion.

6. The method of claim 5 further comprising determining an error for a plurality of points in the region of the image by comparing locations of the plurality of points in the second frame to locations of the plurality of points in the reference frame.

7. The method of claim 6 further comprising establishing a weighting factor based upon the error to control a sensitivity of the blending.

8. The method of claim 1 further comprising:
   converting pixel data in the region of the image having skin from a first format to a second format;
   comparing the pixel data in the second format to a plurality of skin tone definitions in the second format; and
   selecting a skin tone definition of the plurality of skin tone definitions.

9. The method of claim 8 further comprising converting the pixel data in the region of the image having skin from the second format back to the first format.

10. The method of claim 8 further comprising identifying a second region of the image having skin, and selecting a second skin tone definition associated with the second region of the image having skin, wherein selecting a skin tone definition for the frame comprises selecting a skin tone definition based upon the selected skin tone definition and the selected second skin tone definition.

11. The method of claim 8 wherein converting the pixel data in the region of the image having skin from the first format to the second format comprises converting the pixel data from a luminance-chrominance representation to a cylindrical coordinate representation.

12. The method of claim 11 wherein converting the pixel data in the region of the image having skin from the first format to the second format comprises converting the pixel data to a cylindrical coordinate representation having hue and saturation components.

13. The method of claim 8 further comprising implementing edge enhancement in the region of the image having skin based upon the selected skin tone definition.

14. The method of claim 8 further comprising:
   applying specific noise filters for the region of the image having skin; and
   applying image processing on the remaining portions of the image after applying specific noise filters for the region of the image having skin.

15. The method of claim 1 wherein identifying a region of the image having skin comprises identifying a face region.

16. A device for enhancing quality of an image, the device comprising:
   a processor circuit configured to:
   receive the image;
   identify a region of the image having skin;
   perform local and global motion analysis in the region of the image having skin; and
   if motion is detected, and based on results of local and global motion analysis, then controlling blending in the region of the image having skin to avoid blurring of texture of the skin.

17. The device of claim 16 wherein the processor is further configured to establish a feature point associated with the region of the image having skin in a reference frame, wherein the motion is detected based upon a location of the feature point in a second frame compared to a location of the feature point in the reference frame.

18. The method of claim 17 wherein the processor is further configured to establish a local motion threshold, wherein a local motion is detected if the motion exceeds the local motion threshold.

19. A non-transitory computer-readable storage medium having data stored therein representing software executable by a computer for enhancing quality of an image, the computer-readable storage medium comprising:
   instructions for receiving the image;
   instructions for identifying a region of the image having skin;
   instructions for performing, by the computer, local and global motion analysis in the region of the image having skin; and
   instructions for controlling, if motion is detected, and based on results of local and global motion analysis, blending in the region of the image having skin to avoid blurring of texture of the skin.

20. The non-transitory computer-readable storage medium of claim 19 further comprising instructions for establishing a feature point associated with the region of the image having skin in a reference frame, wherein the motion is detected based upon a location of the feature point in a second frame compared to a location of the feature point in the reference frame.

* * * * *